Feb. 10, 1970    H. C. FLINT    3,494,663
SUSPENSION RECLINER
Filed March 10, 1967    2 Sheets-Sheet 1

INVENTOR.
Hyland C. Flint
BY
Barnard, McGlynn & Reising
ATTORNEYS

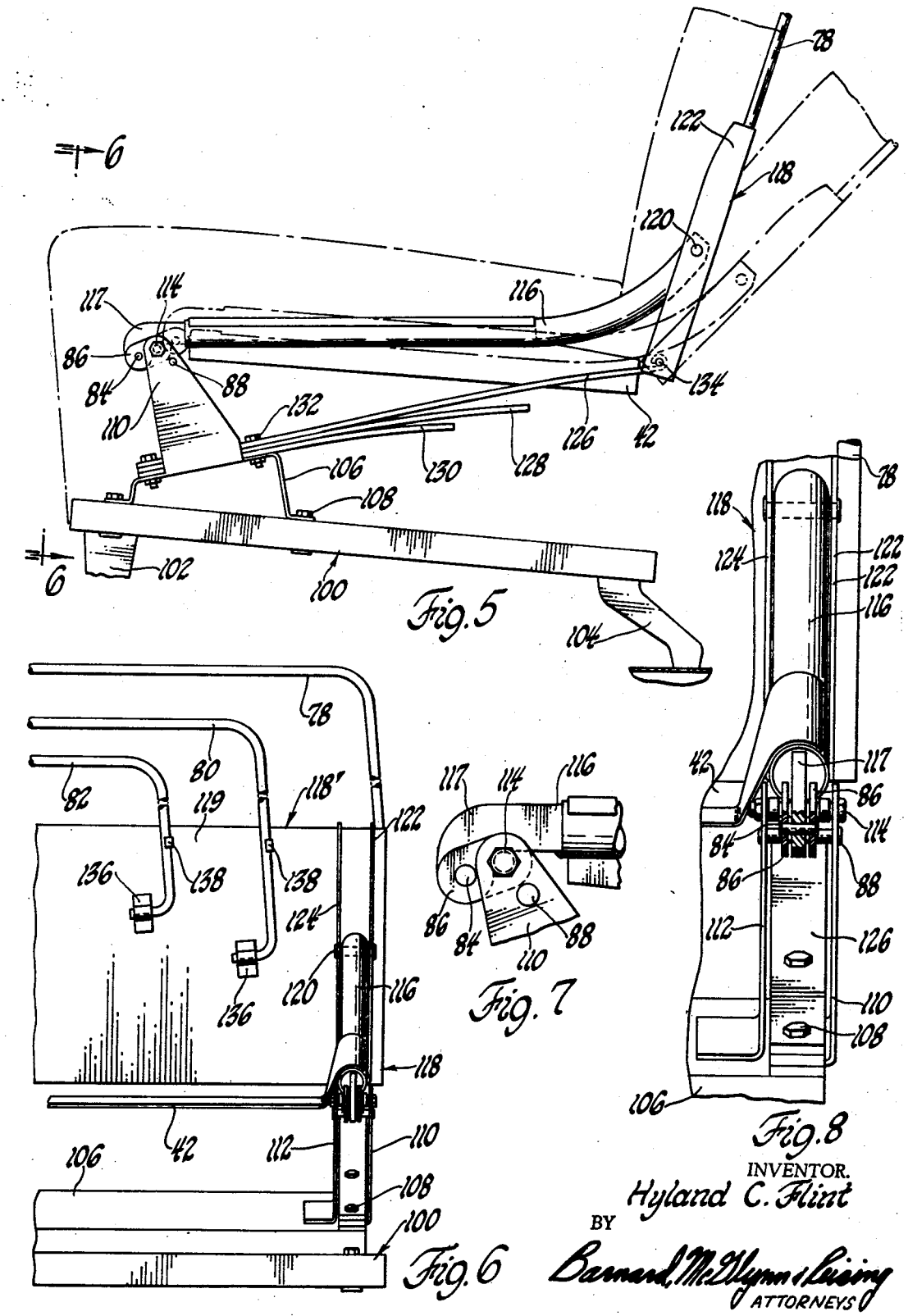

United States Patent Office 3,494,663
Patented Feb. 10, 1970

3,494,663
SUSPENSION RECLINER
Hyland C. Flint, 3551 Walnut Lake Road,
Orchard Lake, Mich. 48033
Filed Mar. 10, 1967, Ser. No. 622,355
Int. Cl. B60n *1/06;* A47c *1/02*
U.S. Cl. 297—354                    17 Claims

ABSTRACT OF THE DISCLOSURE

An energy absorption reclining seat in which, in the upright position, the backrest moves vertically relative to the ground with deflection of the seat under load and in which the backrest moves with the seat under deflection when in the reclined position. Reclining of the backrest relative to the seat is accomplished by pivoting link members pivotally attached to the seat base and pivotally attached to the seat support members. Upon rotation of the link members, the pivot point of the seat support members is moved rearwardly causing the backrest to recline.

---

This invention relates to seat structures and more particularly to a seat structure having a backrest portion reclinable rearwardly of the seat portion and being in full suspension in either the upright or reclined positions.

In many seating installation situations, it is desirable to have a seat structure with a backrest support portion which is reclinable or tiltable rearwardly for the comfort of the occupant of the seat. Typical examples include different types of seating in the transportation industry, such as automotive vehicles and aircraft seating, as well as bus and train seat structures. Furthermore, the use of reclinable seating in stationary furniture, such as household, office or public furniture, is often desirable.

There are many kinds of reclining seat structures presently available for either transportation or stationary use, and in a wide variety of shapes, styles and interior structural configurations. However, the presently available reclining seat structures present problems in design, production and manufacture, as well as in use by the various occupants. In seating used in the transportation industry, for example, the resilient suspension of the seat structure in either the upright or reclined positions vary greatly and seldom are properly designed to provide both absolute comfort for the occupant and insulation from the vibrations, jolts, bumps, and the like, caused by the movement of the structure within which the seat is mounted. In seat structures used in stationary seating, the resilient support for the seat structure is normally to be found only in an upholstry, or upholstry supporting means, and seldom is full suspension of the seat and seat back structure to be found in this type of seating. Generally speaking, the presently available seat structure are complicated and cumbersome affairs with many moving parts and with control systems that are difficult to mount in the seating structure and difficult to operate by the occupant. Such structures are normally expensive, because of the many parts and because of the production and assembly problems in the manufacture thereof. Additionally, there is usually a great deal of supporting structure necessary for the movable parts of such reclining structures, thus increasing the design, manufacture and production difficulties.

The device in which this invention is embodied comprises, generally, a seat structure having a seat portion and a back portion so connected and so mounted as to permit the back portion to move vertically with deflection of the seat portion, when the backrest assembly is in the upright position, the backrest assembly being reclinable rearwardly and being movable with seat deflection for the comfort of the user. The seat and backrest members are supported by springs, other than the usual upholstry springs or the like, to give the occupant a floating sensation in either the upright or reclined position. The seat structure may be so formed as to permit the backrest portion to fold forwardly over the seat portion, should such be desirable in some use such as automotive vehicles. The seat portion is pivotally mounted on a support structure at the forward end thereof so that deflection under load takes place about the forward edge of the seat structure in a rotational direction. The pivotal mounting of the seat structure on the support structure may be moved rearwardly, when it is desired to recline the backrest portion, by simple weight shifting by the occupant, thus moving the pivotal mounting point rearwardly, and without disturbing the suspension support.

A reclining seat constructed in this manner has a relatively few and simple parts easily arranged, manufactured and produced to provide a seat structure for universal usage. All of the parts of the seat may be mounted on a support structure over a relatively small area, greatly facilitating the manufacture and assembly of the structure. The spring support provides complete support at all times for the seat and backrest portions, and under reasonable condition of load, adding to the safety of the installation when used in transportation seating, and adding to occupant comfort when used in stationary installations.

These and other advantages will become more apparent from the following description and drawings in which:

FIGURE 5 is a side elevational view of another preferred embodiment of the invention, showing the position of the various parts;

FIGURE 6 is a front elevational view of a portion of the seat structure illustrated in FIGURE 5, taken substantially along the line 6—6 of FIGURE 5 and looking in the direction of the arrows;

FIGURE 7 is an enlarged view of a portion of the seat structure illustrated in FIGURE 5 to show the pivot mounting of the seat structure;

FIGURE 8 is an enlarged front elevational view with parts broken away and in section of a portion of the seat structure illustrated in FIGURE 5.

Figure 1:
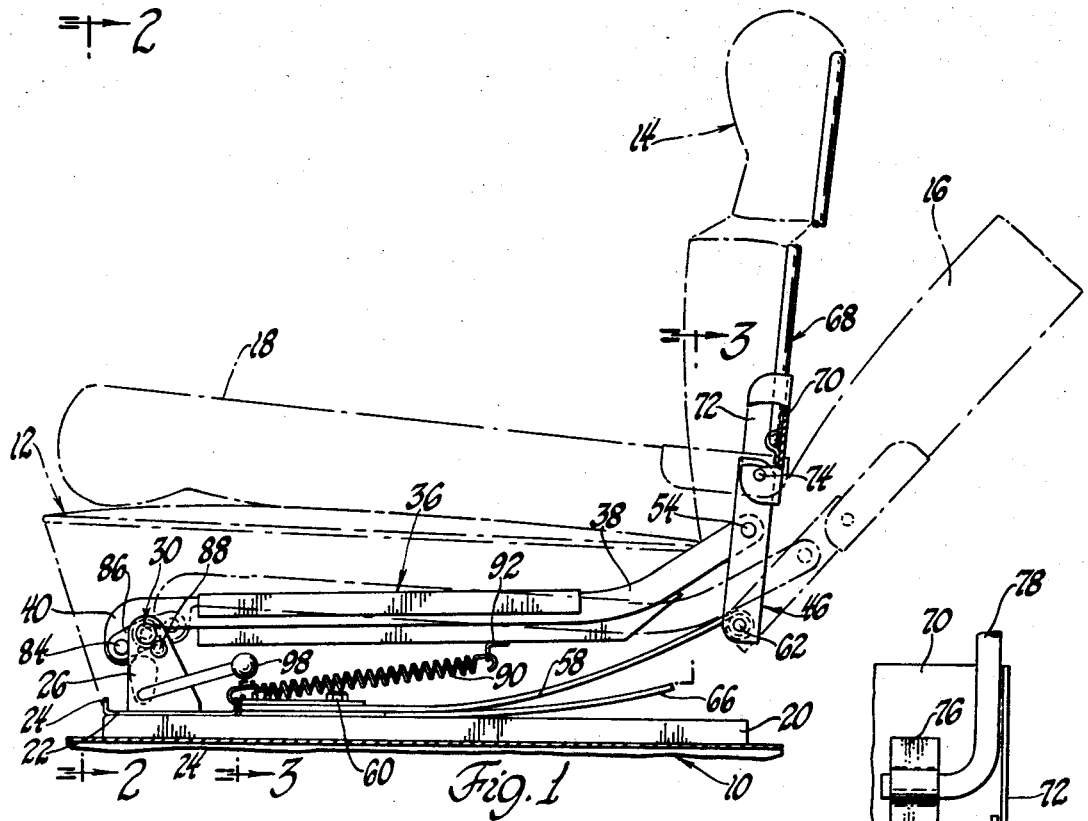
FIGURE 1 is an elevational view, with parts broken away and in section, of a preferred embodiment of the invention showing a seat structure adapted to transportation use.
Figures 2, 3, 4:
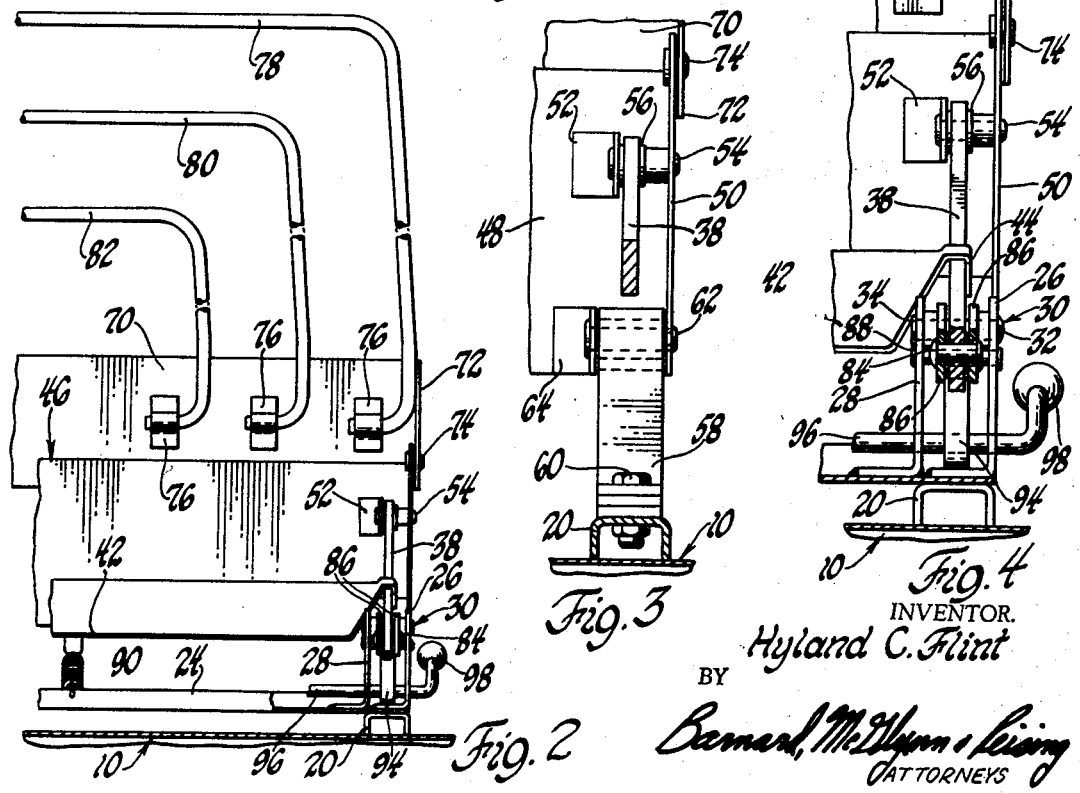
FIGURE 2 is a front elevational view of a portion of the seat structure illustrated in FIGURE 1.
FIGURE 3 is a cross-sectional view of a portion of the seat structure shown in FIGURE 1, taken substantially along the line 3—3 of FIGURE 1 and looking in the direction of the arrows.
FIGURE 4 is an enlarged front elevational view of a portion of the seat structure illustrated in FIGURE 1 with parts broken away and in section.

Referring more particularly to the drawings, FIGURE 1 illustrates a typical seat structure mounted on a support, indicated generally by the numeral 10, the seat structure having an upholstered seat portion, indicated generally by dashed and dotted lines 12. An upholstered back portion, indicated generally by dashed and dotted lines 14, is mounted rearwardly of the seat portion 12 and, as will become hereinafter more apparent, may be reclined rearwardly to a position as shown by the dashed and dotted line 16. When adapted for certain uses, such as the front seats of an automotive vehicle, the backrest structure 14 may be tilted forwardly, as illustrated by dashed and dotted lines 18.

Support structure 10 may be any convenient supporting floor and may have mounted thereon spaced rails 20 of the movable or adjustable kind well known in the art.

Mounted on rails 20 spaced on opposite sides of the seat location, is a base plate 22 having upwardly extending front and rear flanges 24 to provide both strength to the base plate member and a convenient mounting point for certain elements of the seat structure.

It will be apparent that the structural elements of the seat are the same on each side of the seat, and for convenience the description will proceed with respect to only one side. It is to be understood that the other side is substantially the same.

Extending upwardly from base plate 22 are spaced and parallel bracket members 26 and 28, secured to the base plate 22 in any suitable manner. Bracket members 26 and 28 have extending therethrough a pivot pin 30, secured in the spaced brackets 26 and 28 in any suitable manner, as by enlarged end 32 and upset end 34. Extending rearwardly from the brackets 26 and 28 is the seat support structure, indicated generally by the numeral 36. Seat support structure 36 includes a seat support member 38 terminating at the forward end in a downturned portion 40. The crook, or inward bend, of the downturned portion 40 is arcuate in form and is received over the pivot pin 30 extending between brackets 26 and 28. In such position, the seat support members 36 may pivot about the pivot pins 30 as the rearward portion of the seat support structure 36 is deflected under load. Mounted on the seat support member 38 is a pan structure 42 having reversely bent side edges 44 which may be received over the seat support member 38 and secured thereto in any suitable manner. Pan 42 may receive any well known seat cushioning structure such as foam rubber, or the like.

Rearwardly of the base plate 22 and above the support 10 is a rear mounting plate, indicated generally by the numeral 46. Rear mounting 46 includes a transverse portion 48, extending laterally of the seat structure, and a forwardly directed flange 50. Conveniently mounted on the transverse portion 48 is a bracket member 52 spaced from the forwardly directed flanges 50. A pivot pin 54 is received and retained between the flange 50 and bracket 42 in any suitable manner, the pivot pin 54 receiving the rearward end of the seat support member 38. Suitable bushings, or the like, 56 may be provided if necessary.

Secured to the supporting rail 20 and adjacent the base plate 22 is a leaf spring, or the like, 58, secured to the rail 20 in any suitable manner, as by nut and bolt assemblies 60. Leaf spring 58 extends upwardly and rearwardly to a pivot pin 62 retained between the forward extending flange 50 of the rear mounting plate 46 and a second bracket 64 mounted on the the transverse portion 48 of the mounting plate 46. Pivot pin 62 and the rearward end of spring 58 are disposed in spaced relation to the pivot pin 54 supporting the rearward end of the seat support member 38. A secondary suspension spring 66 may be provided so that as spring 58 is deflected, due to a particular load, it may contact secondary spring 66 to provide additional occupant support.

Extending upwardly from the rear mounting plate 46 is the back support structure, indicated generally by the numeral 68. Back support structure 68 includes a transverse member 70 having forwardly directed flanges 72, being pivotally mounted, as by pivot pins 74, in the forwardly directed flange 50 of the mounting plate 46. Secured on the transverse plate 70 are a series of brackets 76 to receive inturned ends of the U-shaped spring wire members 78, 80 and 82 which serve as backrest support means for the upholstry which is mounted thereon. It will be apparent that because of the pivotal connection at pivot 74, the back support structure 68 may be tilted forwardly about the pivot 74 to overlie the seat structure 12, should such be desirable.

Returning to the forward end of seat support member 38, a pivot pin 84 is mounted therein and receives the forward ends of spaced links 86. Links 86 extending rearwardly and upwardly to be pivoted at their opposite ends on the pivot pin 30 extending between the brackets 26 and 28. It will now be apparent that the seat support members 38 may be moved rearwardly by raising the forward end 40 of the member 38 to clear the pivot pin 30. In so doing, the links 56 rotate about the pivot pin 30 and when properly positioned rearwardly, the seat support members 38 pivot about the pivot pin 84 disposed between the links 86. A suitable stop pin 88 is mounted in the brackets 26 and 28 and extends therebetween to limit the rotational movement of the links 86 about the pivot pin 30.

By positioning the seat support member 38 rearwardly of the brackets 26, the rear mounting plate 46 is tilted rearwardly about the pivot connection 62 between the rear mounting plate 46 and the spring 58, carrying with it the back support structure 68. Thus, the back support structure 68 is rearwardly reclined and fully supported on the springs 58 and 66.

In order to ease the movement of the seat support structure 36 rearwardly and forwardly, so as to move the backrest structure 68 to and from the reclined position, a spring 90 is secured at one end, in any suitable manner, to the seat support structure 36, as at bracket 92 secured to the pan 42. The spring 90 is secured at its forward end in the rearward flange 24 of the base plate 22. When the backrest structure 68 is in the reclined position, the spring 90 exerts a force tending to pull the seat support structure 36 forwardly and thus assist in moving the back support structure 68 to the upright position.

When the seat support structure is in the upright position, and in order to assist in moving the seat support 22. When the backrest structure 68 is in the reclined member 38 away from the pivot pin 30, a cam 94, mounted on a control rod 96 extending between the brackets 26 and 28, may be rotated by the handle 98 of the control rod 96 to rotate in a counter-clockwise direction, as viewed in FIGURE 1. Rotation of cam 94 begins to lift the forward end 40 of the seat support member 38, causing the links 86 and seat support member 38 to move over the pin 30.

It is not intended that the cam 94 and operating rod 96, or the spring 90, causes the complete movement of the backrest structure 68 relative to the seat support structure 36, but rather that the cam and lever control, as well as the spring 90 in the reverse direction, merely assists the occupant of the seat to cause the positional change by a shift of weight, or the like.

Referring next to FIGURES 5 through 8, a modification of the above described seat structure is illustrated. The structure illustrated in FIGURES 5 through 8 may conveniently be used as stationary seating, such as in home or office furniture or as seating in public accommodations. The support structure indicated generally by the numeral 100 may be formed of wood or any other suitable material, and has forward and rearward legs 102 and 104. Mounted on the support structure 100 is a base plate 106, secured to the support structure 100 in any suitable manner, as by bolts 108. Extending upwardly from the base plate 106 are bracket members 110 and 112, secured to the base member 106 in any suitable manner. Extending between the brackets 110 and 112 is a pivot pin 114 serving as a pivot point for the seat support member 116. Seat support member 116 includes a downwardly formed forward end 117, to which links 86 are pivotally connected, as by pin 84. The rearward end of links 86 are pivotally received on the pivot pin 114.

Seat support members 116 extend rearwardly to the rear mounting plate 118 and are pivotally mounted therein by means of pins 120, disposed between forwardly directed flanges 122 and 124.

Extending upwardly and rearwardly from the base plate 106 are the supporting springs 126, 128 and 130, such springs being successively picked up as the seat structure deflects under load. Springs 126, 128 and 130 are secured to the base plate 106 in any suitable manner, as by nut and bolt assemblies 132. Spring 126 is pivotally received on a pivot pin 134, extending between the flanges 122 and 124 of the rear mounting member 118.

Secured to the transverse portion 119 of the rear mounting member 118, are the U-shaped backrest spring support wires 78, 80 and 82, received in suitable brackets 136, and held in place by clips 138 as necessary.

It will be apparent from the foregoing discussion that the rear mounting plate 118, and thus the entire back support structure, can be tilted rearwardly by means of the forward end 117 of the seat support member 116 being moved rearwardly to disengage from the pivot pin 114 and to pivot about the links 86, such links being moved to their rearward position in engagement with the stop 88.

It will now be apparent that with the modifications of either FIGURES 1 through 4 or 5 through 8 that when the backrest structure is in the upright position, deflection of the seat structure about the forward pivots will cause the back support structure to move downwardly in such way as to maintain its angularity relative to the supporting structure, such as floor 10 or platform 100. When the backrest structure is reclined rearwardly, the seat supporting members 38, or 116, will engage the springs 58, or 126, adjacent the pivots 62, or 134. Thus, rearward reclining movement is limited by such engagement, the engagement being maintained by the weight of the occupant on seat structure.

Thus, a reclining seat is provided which is relatively simple in operation and is composed of a few number of parts easily manufactured and assembled. The overall structure is uncomplicated and uncumbersome, both in structure and appearance. The spring support is complete, whether the seat be in the upright or in the reclined position, for the added comfort of the occupant.

While numerous changes and modifications to the structures hereinbefore described and shown will occur to those having skill in the art after having had reference to the foregoing description and drawings.

The embodiments of the invention in which an exclusive property or privilege is claimed are defined as follows:

1. A reclining seat comprising:
   supporting means;
   seat support means having a first position pivotally mounted at the forward portion thereof on said supporting means and extending rearwardly in spaced relation thereto, said seat support means being deflectable under load to rotate about the pivotal mounting on said supporting means;
   link means pivotally connected to said seat support means and pivotally connected to said supporting means and being pivotable around said supporting means to move said seat support means rearwardly to a second position, said seat support means being deflectable under load in said second position to rotate around the pivotal connection with said link means;
   a mounting member pivotally mounted on said seat support means and rearwardly thereof;
   resilient support means extending from said supporting means to said mounting member and being pivotally connected thereto for supporting said seat support means under load; and
   brackrest means secured to and extending upwardly from said mounting member, said backrest means and said mounting member being rearwardly reclinable with movement of said seat support means from said first position to said second position.

2. The reclining seat set forth in claim 1 wherein said backrest means includes a lateral member pivotally secured to said mounting member to permit said backrest member to be folded forwardly over said seat supporting means.

3. The reclining seat set forth in claim 1 and further including spring means extending between said mounting member and said supporting means for biasing said seat support means toward said first position.

4. The reclining seat set forth in claim 1 and further including lever and cam means mounted in said support means and engageable with said link means, said lever and cam means being operable to move said link means and said seat support means from said first position toward said second position.

5. A reclining seat comprising:
   support means;
   a base member mounted on said support means;
   brackets extending upwardly from said base member;
   pivot shafts mounted in said brackets;
   seat support members received on said pivot shafts and having downturned forward ends extending below said pivot shafts, said seat support members extending rearwardly from said brackets and being deflectable under load to rotate about said pivot shafts;
   links pivotally received on said pivot shafts and being pivotally mounted in said forward ends of said seat support members, said links and said seat support members being movable to disengage said seat support members from said pivot shafts and to permit rotation of said seat support members about the pivot connection between said seat support members and said links;
   backrest means pivotally mounted at the rearward end of said seat support members and extending upwardly therefrom;
   spring support means secured to said base member and pivotally mounted in said backrest means at points spaced from the pivot connections between said backrest means and said seat support members; and
   said spring support means and said seat support members causing said backrest means to recline rearwardly when said seat support members are disengaged from said pivot shafts.

6. The reclining seat set forth in claim 5 and further including a spring member extending between said backrest means and said base member and biasing said backrest means toward an upright position.

7. The reclining seat set forth in claim 6 and further including cam members mounted in said brackets and rotatable to move said set support arms toward a disengaged position from said pivot shafts.

8. The reclining seat set forth in claim 7 wherein said backrest means includes a first lateral member pivotally receiving said set support members and said spring support means, and a second lateral member pivotally secured to said first lateral member pivotally secured to said first lateral member and being foldable forwardly over said set support members.

9. The reclining seat set forth in claim 8 wherein said backrest means includes a plurality of U-shaped spring wire members secured to said second lateral member and extending upwardly therefrom.

10. The reclining seat set forth in claim 9 and further including a pan member secured to said seat support members and extending thereacross.

11. A reclining seat comprising:
    support means;
    a base member mounted on said support means;
    bracket members mounted on said base member and extending upwardly therefrom;
    pivot shafts mounted in said bracket members;
    links pivotally mounted on said pivot shafts;
    seat support members pivotally mounted on said links and extending rearwardly therefrom, said seat support members having a first position in engagement with said pivot shafts for rotation therearound and a second position rearwardly spaced from said pivot shafts for rotation around the pivotal connection with said links;

a spring support member secured to said base means and extending upwardly and rearwardly therefrom;

a rear mounting plate pivotally secured to the rearward end of said spring support member and pivotally secured to the rearward end of said seat support members, said last-named pivot being spaced from said pivot connection to the rearward end of said spring support member;

a backrest structure extending upwardly from said rear mounting plate and being movable with deflection of said seat support members so as to maintain the angularity of said backrest structure relative to said base means;

said backrest structure and said mounting plate being rearwardly reclinable with movement of said seat support members from said first position to said second position, said seat support members engaging said spring support members when in said second position so that said backrest structure substantially maintains its angularity with said seat support members upon deflection thereof; and a spring secured to said base member and to said rear mounting plate to bias said seat support members from said second position to said first position.

12. A seat comprising; supporting means, backrest means, means pivotally connecting said backrest means to said supporting means, seat support means pivotally connected to said backrest means, adjustment means operatively interconnecting said seat support means and said supporting means for adjusting the position of said seat support means to adjust the angular position of said backrest means, and a pivotal connection between said seat support means and said adjustment means, said adjustment means including manually operable means for changing the position of said pivotal connection in adjusting the angular position of said backrest means.

13. A seat as set forth in claim 12 wherein said means pivotally connecting said backrest means to said supporting means includes a member connected to said supporting means and pivotally connected to said backrest means.

14. A seat as set forth in claim 13 wherein said member interconnecting said backrest means and said supporting means resiliently supports said backrest means.

15. A seat as set forth in claim 15 wherein said seat support means, said supporting means, said backrest means and said member define a quadrangle.

16. A seat assembly comprising: supporting means, backrest means; resilient means connected to said supporting means and pivotally connected to said backrest means for resiliently supporting said backrest means, seat support means pivotally connected to said backrest means, and adjustment means operatively interconnecting said seat support means and said supporting means for adjusting the position of said seat support means to adjust the angular portion of said backrest means.

17. An assembly as set forth in claim 18 wherein said adjustment means includes a manually operable handle for changing the position of said seat support means.

References Cited

UNITED STATES PATENTS

| | | | |
|---|---|---|---|
| 2,366,730 | 1/1945 | Hickman | 248—376 X |
| 2,638,150 | 5/1953 | May | 297—313 |
| 2,855,026 | 10/1958 | Simons, et al. | 297—355 X |
| 2,926,948 | 3/1960 | Korlin, et al. | 297—378 X |
| 2,936,823 | 5/1960 | Neely | 297—378 X |
| 3,362,746 | 1/1968 | Huyge | 297—313 |

BOBBY R. GAY, Primary Examiner

G. O. FINCH, Assistant Examiner

U.S. Cl. X.R.

297—294, 344, 361